Jan. 19, 1954     G. H. RIVIERE     2,666,408
SIGNALING DEVICE
Filed June 5, 1951
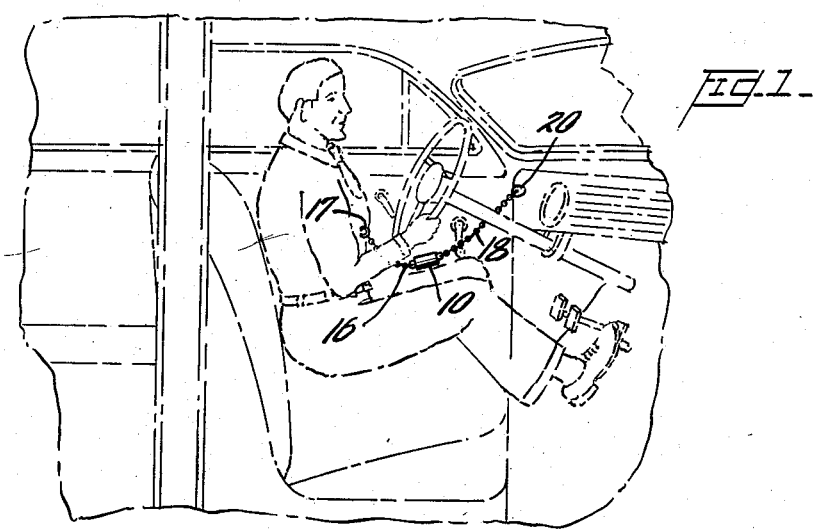
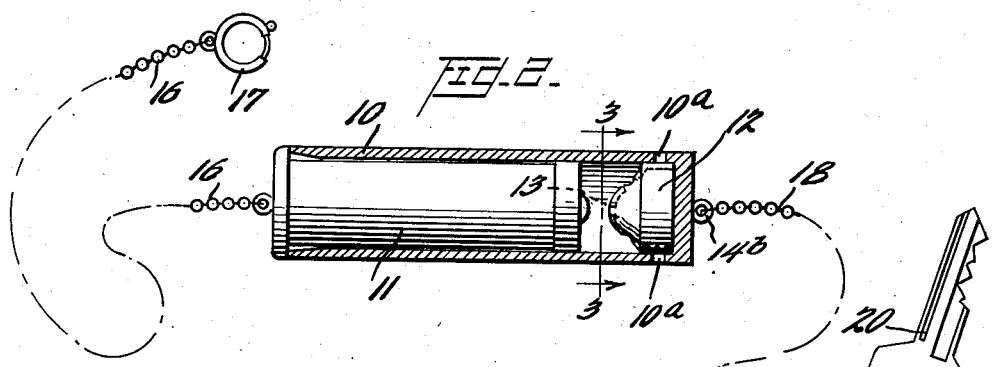
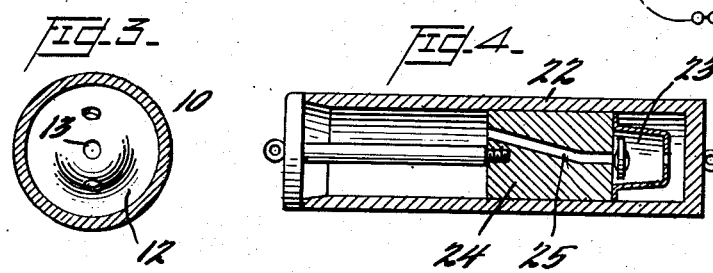
INVENTOR
George H. Riviere
BY Watson, Cole, Grindle & Watson
ATTORNEYS Patented Jan. 19, 1954

2,666,408

UNITED STATES PATENT OFFICE 2,666,408

SIGNALING DEVICE

George H. Riviere, New Iberia, La.

Application June 5, 1951, Serial No. 229,988

3 Claims. (Cl. 116—67)

1

This invention relates to signaling devices and particularly to a signaling device designed and intended to be used by motor vehicle operators for the purpose of effectively reminding any operator leaving the driver's seat of his vehicle of the fact that he has not removed the ignition key if, as a matter of fact, he has failed to remember to do so.

It not infrequently happens that the driver of a motor vehicle will stop or park the vehicle with motor running and will leave the vehicle without breaking the ignition circuit and removing the ignition key. While this omission may sometimes not be a matter of great moment, owing to the prompt return of the driver, it may nevertheless happen, and sometimes does, that failure to remove the ignition key results in continued operation of the motor vehicle engine until the fuel is exhausted or, more unfortunately still, the condition of the vehicle is discovered by one unauthorized to use it and is stolen.

Various devices or alarms for reminding motor vehicle operators of their omissions to perform necessary manipulations have been used with success but few of the many suggestions have been adopted or used on any substantial scale, for various reasons, for instance, because of cost, installation difficulties, and the like.

The present invention provides a signal or alarm device which, although entirely effective for the purpose intended, i. e. which will definitely inform a forgetful driver of the fact that he has omitted to remove his ignition key upon parking, is nevertheless of such simple character that it may be produced at small cost, is readily applicable to any vehicle without modification of any vehicle structure, in fact may be carried conveniently in the pocket of the operator from vehicle to vehicle and used in association with vehicle ignition keys of all types.

Essentially the improved signaling device comprises a signaling means, preferably of sound producing type, which comprises two normally engaged but separable parts and which is activated or caused to produce a warning signal when subjected to oppositely directed forces, together with means for attaching one part of the device to an ignition key and the other to the clothing of the operator. The signaling means, for instance, may be in the nature of a whistle which emits a shrill sound when a plunger or piston is moved longitudinally of a cylinder, thus causing a current of air to flow rapidly through a sound producing element. Where such a form of the invention is employed the piston and cylinder are separable so that, if the cylinder, for instance, is connected to the ignition key and the piston to the clothing of the vehicle operator, the piston and cylinder will separate if the operator attempts to leave his seat without first removing the key and the possibility that his clothing may be torn is thus avoided. The device may have numerous forms or embodiments and one embodiment which is preferred is illustrated by way of example in the accompanying drawings, in which Figure 1 is a perspective view looking into the fore-compartment of a motor vehicle of the passenger car type, showing the signaling device as it will appear when in operative position, connected to the ignition key of the vehicle and to the clothing of the driver;

Figure 2 shows the actual signaling device in longitudinal section, likewise one form of means for attaching the device to an ignition key and to the clothing of the driver;

Figure 3 is a section on line 3—3 of Figure 2; and

Figure 4 is a longitudinal section through an alternative or modified form of signaling member.

Where the alarm device is to produce an audible signal it is found that means to produce a whistling sound functions in a satisfactory manner. Such a means may comprise a whistle member of ordinary or well-known character and means in the nature of a cylinder and plunger for drawing or forcing air through the whistle to produce the desired sound. The cylinder is preferably formed with a closed end and an open end and the piston, which is slidably contained in the cylinder, is readily removable and insertable.

In Figure 2 of the drawings a cylinder is indicated at 10 and the piston slidably housed therein at 11. Within the cylinder and at the closed end thereof is a whistle element 12 formed in any known manner so as to have a central duct or channel 13 through which air may be drawn or forced and as a result of which the whistling sound is created. Lateral openings in element 12 register with openings 10a in the cylinder wall so that air may be freely drawn into the whistle cavity from without when the piston is retracted. The piston 11 is relatively long, measured longitudinally of the axis of the cylinder, so that it may not become cramped or bound due to tilting relatively to the cylinder. To the piston is attached the ring 14. It will be clear that longitudinal reciprocation of the piston within the cylinder will cause a current of air to pass through aperture 13 and create a whistling sound.

It is intended that the device selected for disclosure by way of example shall function when the piston is withdrawn from the cylinder and hence the piston when it occupies the position in which it is shown in Figure 2 is in its initial position. To the free end of the ring 14 is connected one end of a flexible element 16, in the nature of a chain, this element having attached to its extreme end a device or fitting 17 by means of which it may be readily attached to the clothing of the user, the ring 17 being passed through a buttonhole, attached to his belt, or secured in any other convenient manner. The ring 14b attached to the closed end of the cylinder is connected by any similar flexible element 18, having an attachment device 19, to a key 20, the attachment device 19 being such that attachment to a key may be readily effected whenever desired. The total overall length of the signaling device, plus the flexible elements 16 and 18, will be such that the piston 11 will remain in the position in which it is shown within the cylinder 10 during all ordinary movements of the vehicle driver. Should the driver, however, leave his seat without removing the ignition key the flexible elements 16 and 18 will be placed under tension and the piston will be drawn longitudinally of the cylinder away from the whistling device 12. A sharp whistle will thus be caused and the driver will be advised that he has forgotten to remove the key. Should he move rapidly from his seat the piston will be wholly withdrawn from the cylinder 10, thus preventing tearing of the driver's clothes or breaking of the key. The piston, however, may be readily re-inserted into the cylinder in order to place the signaling device in condition for further operation. When not in use the device can readily be carried in the pocket and at all times presents a neat and finished appearance, conveniently carried and readily placed in operative position.

As previously stated, various forms of the device may be developed which vary somewhat in appearance and details of construction from that illustrated in Figures 1, 2 and 3. For instance, the cylinder may be formed as indicated at 22 in the modified form of signal shown in Figure 4, the closed end of the cylinder being imperforate. A whistle device 23 may be actually attached to the piston 24, through which passes a small duct 25. In this form of the invention, as in the form first described, the piston 23, if wholly withdrawn from the cylinder 22, may be readily re-inserted so that, after each operation, the device can be quickly and easily restored to operative position. While in each form of the invention the sound producing member is within the cylinder the whistling sound may nevertheless be clearly heard when the piston is moved. If desired, however, a sounding reed or the like may be placed in an aperture in the wall of the cylinder, or even just outside of the cylinder and over an aperture in the cylinder wall.

Having thus described the invention, what is claimed as new and desired to be secured by Letters Patent is:

1. In a signaling device for warning a motor vehicle operator to remove the ignition key upon his leaving the operator's seat, in combination, a signaling device having two relatively movable members formed to slide upon each other to define a chamber of varying volume and to be separated when relatively moved through a predetermined distance in opposite directions, one of said movable members having an aperture through which a current of air may pass into or out of said chamber when said members are moved relatively to each other and having a sound-creating device associated with said aperture which makes an audible signal when said members are relatively moved in opposite directions to effect their separation, a first flexible connecting element having an end fixed to one of said movable members and having its other end fixed to an ignition key attachment means, and a second flexible connecting element having an end fixed to said other movable member and having its other end fixed to a clothing attachment means.

2. The combination set forth in claim 1 in which said movable members comprise a piston and cylinder, the cylinder having an open end and a closed end, the closed end containing said aperture and said sound-creating device through which air will enter the cylinder as the piston is drawn toward the open cylinder end.

3. The combination set forth in claim 1 in which said movable members comprise a piston and cylinder, the cylinder having an open end and a closed end, the piston containing said aperture and said sound-creating device through which air will enter the cylinder as the piston is drawn toward the open cylinder end.

GEORGE H. RIVIERE.

References Cited in the file of this patent

UNITED STATES PATENTS

| Number | Name | Date |
|---|---|---|
| 149,908 | Baldwin | Apr. 21, 1874 |
| 277,581 | Leggett | May 15, 1883 |
| 815,667 | Winger | Mar. 20, 1906 |
| 838,759 | Truitt | Dec. 18, 1906 |
| 1,347,005 | Bini | July 20, 1920 |
| 1,378,769 | Donelan | May 17, 1921 |
| 1,686,233 | Halliday | Oct. 2, 1928 |
| 1,802,922 | McCollam | Apr. 28, 1931 |